United States Patent
Titcomb et al.

(10) Patent No.: US 9,677,291 B2
(45) Date of Patent: Jun. 13, 2017

(54) TURNBUCKLE CLIP FOR USE WITH CONCRETE FORMING PRODUCTS

(71) Applicant: Titcomb Brothers Manufacturing, Inc., Westport, MA (US)

(72) Inventors: Ted Titcomb, East Sandwich, MA (US); Paul S. Titcomb, Westport, MA (US)

(73) Assignee: Titcomb Brothers Manufacturing, Inc., Westport, MA (US)

(*) Notice: Subject to any disclaimer, the term of this patent is extended or adjusted under 35 U.S.C. 154(b) by 0 days.

(21) Appl. No.: 15/013,259

(22) Filed: Feb. 2, 2016

(65) Prior Publication Data

US 2016/0222681 A1 Aug. 4, 2016

Related U.S. Application Data

(60) Provisional application No. 62/110,894, filed on Feb. 2, 2015.

(51) Int. Cl.
  *E04G 17/14* (2006.01)
  *F16M 13/02* (2006.01)
  *E04G 17/04* (2006.01)
  *E04G 21/26* (2006.01)

(52) U.S. Cl.
  CPC ............ *E04G 17/14* (2013.01); *E04G 17/04* (2013.01); *E04G 21/26* (2013.01); *F16M 13/02* (2013.01); *F16M 2200/028* (2013.01)

(58) Field of Classification Search
  CPC ............ F16M 2200/025; F16M 13/02; F16M 2200/028; Y10T 24/44017; Y10T 24/45796; E04G 17/14; E04G 21/26

USPC ............... 248/223.41, 225.11; 52/714, 715; 249/219.1, 219.2

See application file for complete search history.

(56) References Cited

U.S. PATENT DOCUMENTS

| | | | | |
|---|---|---|---|---|
| 1,082,470 A | * | 12/1913 | Phelan ............... | E04B 1/2608 249/219.1 |
| 1,552,334 A | * | 9/1925 | Mosher .............. | E04G 17/001 24/580.1 |
| 2,215,843 A | * | 9/1940 | Tieri ..................... | G09F 1/10 248/223.41 |
| 2,273,198 A | * | 2/1942 | Hillberg .............. | E04G 17/0721 249/213 |
| 3,077,652 A | * | 2/1963 | Hillberg ............... | E04G 11/10 249/219.1 |
| 3,363,877 A | * | 1/1968 | Gates ................... | E04G 17/06 249/190 |

(Continued)

*Primary Examiner* — Michael Safavi
(74) *Attorney, Agent, or Firm* — Nelson Mullins Riley & Scarborough LLP; Anthony A. Laurentano (57) ABSTRACT

The clip of the present invention comprises a main body having opposed front and rear faces, opposed first and second side ends and opposed top and bottom ends. The first side end has a first channel or groove formed therein and the second side end has a second channel formed therein. The length of the first channel is greater than the length of the second channel and the height of the second channel is greater than the height of the first channel. The top side of the main body has a first lip portion formed thereon and the bottom side has a second lip portion formed thereon. The first and second lips extend generally outwardly in the same direction relative to a face of the main body.

6 Claims, 5 Drawing Sheets

(56) References Cited

U.S. PATENT DOCUMENTS

| | | | | |
|---|---|---|---|---|
| 3,438,664 | A * | 4/1969 | Meyer | F16B 2/241 |
| | | | | 249/219.1 |
| 4,228,986 | A * | 10/1980 | Schimmel | E04G 17/00 |
| | | | | 249/191 |
| 4,838,507 | A * | 6/1989 | Fricker | E04F 13/0855 |
| | | | | 248/230.1 |
| 5,935,482 | A * | 8/1999 | Schworer | E04G 11/483 |
| | | | | 249/210 |
| 7,726,617 | B2 * | 6/2010 | Zambelli | F16M 11/04 |
| | | | | 248/222.12 |
| 2009/0289159 | A1 * | 11/2009 | O'Keene | F16M 11/10 |
| | | | | 248/225.11 |

* cited by examiner

TURNBUCKLE CLIP FOR USE WITH CONCRETE FORMING PRODUCTS

RELATED APPLICATION

This application claims priority to U.S. provisional patent application Ser. No. 62/110,894, filed on Feb. 2, 2015, entitled Apparatus and Methods For Use With Concrete Forming Products, the contents of which are hereby incorporated by reference.

FIELD OF THE INVENTION

The present invention is related to the fabrication of concrete walls, such as for home foundations, using suitable concrete forms, and particularly to a device and apparatus employed in connection with the concrete forms for forming the concrete walls.

BACKGROUND OF THE INVENTION

Conventional concrete walls may be created by pouring concrete into a suitable concrete form. As is known in the art, concrete foundation walls are generally poured between two sets of concrete forms disposed in essentially parallel relationship and defining therebetween a channel having a dimension for the desired thickness of the concrete wall. Such opposed, spaced apart walls are generally held in a fixed relationship relative to each other against the immense weight of any poured concrete by tie-wires and turnbuckle assemblies having abutment surfaces against which a locking or latching arm on adjacent form sections abut. Once assembled into the shape of the wall, wet concrete is poured into the channel formed between the concrete forms and allowed to cure. The concrete forms typically comprise multiple form panels, which may for example be formed of wood or any other suitable well known material. The height of the form panel may vary by application.

Multiple form panels may be placed side-by-side in order to construct a wall of a desired length. Because the wet poured concrete takes the shape of the forms in which it is placed, the finished concrete wall corresponds in configuration to the assembled form. Therefore, it is important to align precisely the panels composing the concrete form in order to ensure that the finished wall has the desired appearance and strength.

Another problem that can occur when employing concrete forms involves straightening the panels so that they do not lean inwards or outwards. For this purpose, and for securing the panels together, some panels include one or more panel bars that extend horizontally across the panel. The panel bars may be, for example, metal bars about 2 inches wide that are affixed to the form panel. If multiple panel bars are provided on a single panel, they may be spaced at predetermined locations along the height of the form panel.

The panel bar may include a latch or lever that allows the panels to be clipped together side-by-side, as well as a plurality of shoulder bolts. A turnbuckle can be mounted to the panel bar in the vicinity of the shoulder bolts, with for example, the shoulder bolt positioned to the left of the turnbuckle and the latch on the right of the turnbuckle. The turnbuckle may contact the shoulder bolt in order to hold the turnbuckle in place.

Further, the turnbuckle may be attached to one end of a bracing arm. The other end of the bracing arm can be secured to the ground in front of the form. By adjusting the length of the turnbuckle for one or more panel arms on the form panel, the amount of lean or tilt in the panel may be changed. Accordingly, the panel can be aligned so as to be vertical (if a vertical alignment is desired).

Problematically, there is no single standard location for the shoulder bolts formed on the panel bar. Thus, turnbuckles that are well-suited to use with one type of panel bar are not well suited for use with another panel bar made by a different manufacturer.

Moreover, conventional turnbuckles are generally constituted as flat plates that are placed beside the shoulder bolt. Because of the shape of the turnbuckles and the load applied to the turnbuckle during the alignment of the panel forms, the turnbuckle attachment plates have a tendency to rotate and fall away from the shoulder bolts. As a result, the turnbuckles are sometimes nailed into place, which damages the form panels and reduces their longevity.

SUMMARY OF THE INVENTION

Exemplary embodiments described herein address these and other problems associated with positioning and aligning concrete forms.

According to an exemplary embodiment, the clip of the present invention includes selected channels formed on opposed vertical sides of the clip. At least one of the channels is intended to seat a shoulder bolt formed on the panel bar and the other channel is configured to provide clearance for installing the clip between an adjacent pair of shoulder bolts and for allowing the latch of an adjacent panel to swing into place. The clip may also include a pair of opposed lips formed on opposed horizontal sides which are configured to interface with one or more edges of the panel bar. A distance between the first lip and the second lip may be selected so as to engage either channel with the shoulder bolt on two or more different predetermined configurations of panel bars, while simultaneously engaging one or both of the lips with an edge of the panel bar.

According to one practice, the present invention is directed to a clip, such as a turnbuckle clip used in a turnbuckle brace assembly. The clip comprises a main body having opposed front and rear faces, opposed first and second side ends (e.g., vertically extending sides), and opposed top and bottom ends (e.g., horizontally extending sides). The first side end has a first channel or groove formed therein and the second side end has a second channel formed therein. The length or depth of the first channel is greater than the length or depth of the second channel and the height of the second channel is greater than the height of the first channel. The top side of the main body has a first lip portion formed thereon and the bottom side has a second lip portion formed thereon. The first and second lips extend generally outwardly in the same direction (from the rear face) relative to a face of the main body.

The bottom side of the clip main body also includes a skirt portion that is separate and distinct from the bottom lip portion. The skirt portion extends in a direction generally opposite to the direction of the second lip. The skirt portion also includes an aperture formed therein. The aperture is sized and dimensioned for coupling to another mechanical portion of the turnbuckle brace assembly, such as for example a coil thread turnbuckle brace component. Those of ordinary skill in the art will readily recognize that the aperture can be couple to other and different types of mechanical components.

According to one practice, the main body of the clip has a width, as measured between the first and second side ends, in the range of between about 2 inches and about 2.5 inches, and preferably has a width of about 2.1875 inches.

Further, the clip has a general height as measured between the top and bottom ends, and as specifically measured between the first and second lips, of between about 2.25 inches and about 2.375 inches, and is preferably about 2.3125 inches.

The exemplary embodiments will now be described in detail with reference to the attached drawings.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
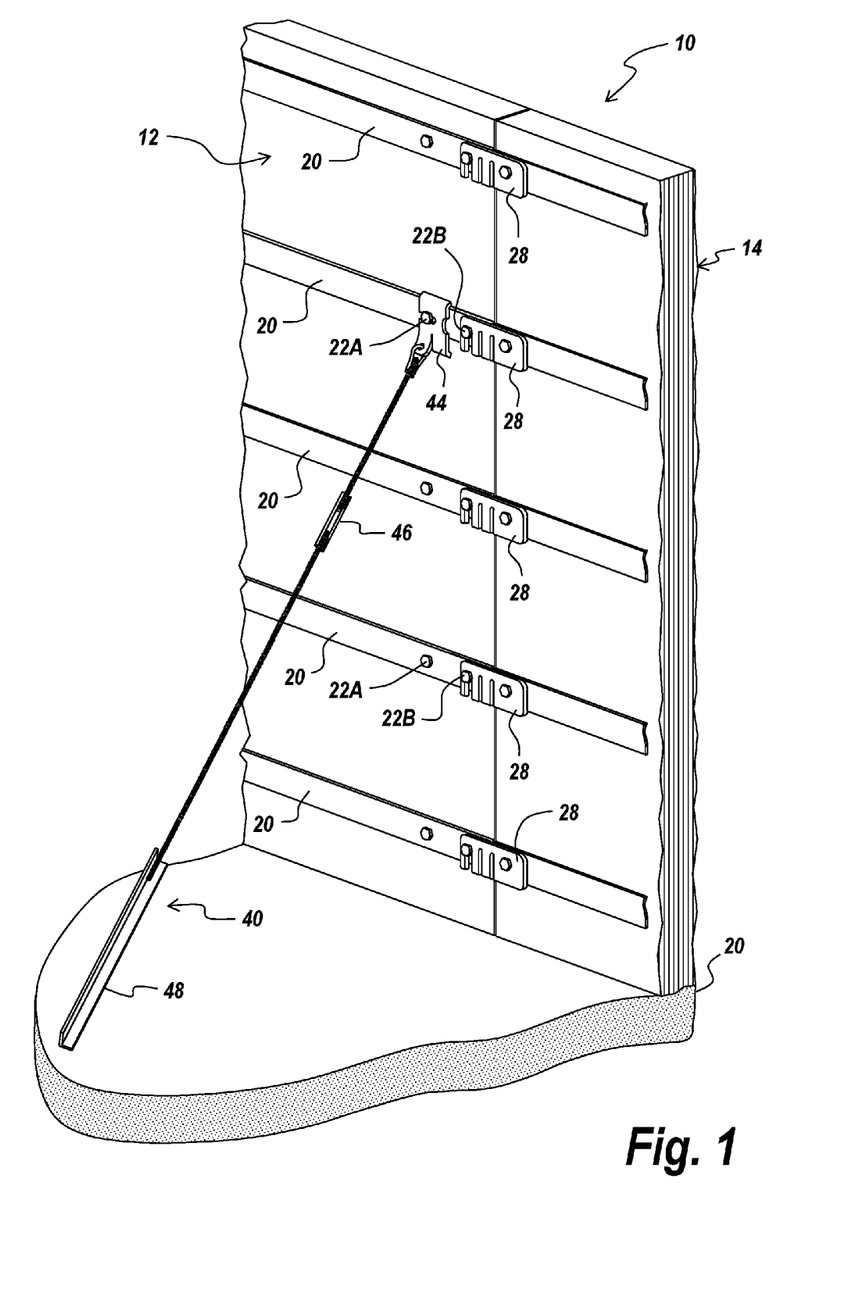
FIG. 1 is a partial perspective view of a concrete forming system employing the turnbuckle assembly of the present invention.
Figure 2:
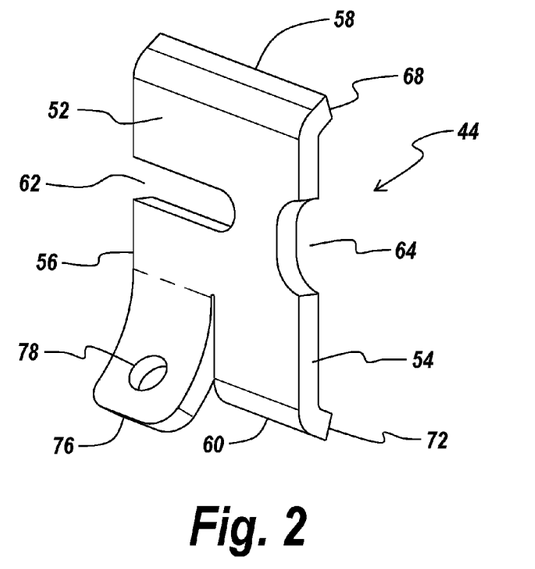
FIG. 2 is a perspective view of the turnbuckle clip of the turnbuckle clip assembly according to the teachings of the present invention.
Figure 3:
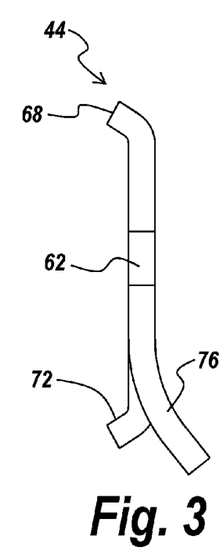
FIG. 3 is a side view of the turnbuckle clip of FIG. 2 according to the teachings of the present invention.
Figures 4, 5:
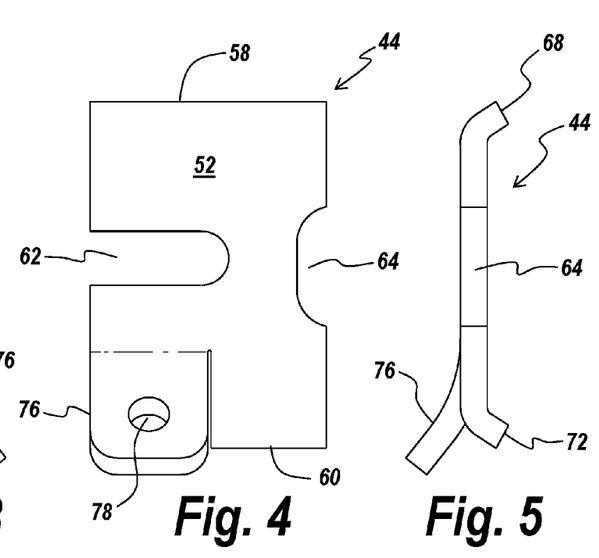
FIG. 4 is a front view of the turnbuckle clip of FIG. 2 according to the teachings of the present invention.
FIG. 5 is a side view from the side opposite that of FIG. 3 of the turnbuckle clip according to the teachings of the present invention.

FIG. 1 illustrates a portion of a concrete forming system 10 according to the teachings of the present invention. The concrete forming system 10 includes a pair of concrete forms 12, 14 that form one wall, such as an outer wall, of a concrete wall to be constructed or formed. Those of ordinary skill in the art will readily recognize that a pair of opposed concrete forms can be used (not shown) and which are aligned with and spaced apart from the illustrated forms 12, 14 to form a space or channel therebetween. A concrete mixture can be poured in the channel formed between the forms and allowed to harden or cure into a concrete wall. The concrete wall can form part of a foundation 20 for a suitable structure, such as a home. Those of ordinary skill in the art will readily recognize that any selected number of adjacent forms can be used depending upon the size and overall length of the wall. For the sake of simplicity, only a pair of forms is illustrated. The concrete forms can have any selected shape and are preferably in the shape of a panel. The typical concrete form can be composed of plywood with a selected overlay material secured thereto. The panel can have any selected thickness, and preferably has a thickness of about 1.125 inches.

The concrete forms 12 and 14 can each have attached thereto one or more panel bars. As illustrated, a plurality of panel bars 20 can be attached to each concrete form 12, 14. The panel bars have associated therewith a plurality of shoulder bolts. As illustrated, each of the panel bars 20 have at an end portion thereof a plurality of shoulder bolts 22A, 22B. A lever or latch mechanism 28 is also provided and formed on one end of a concrete form 14 and has a selected configuration that allows the latch to engage a shoulder bolt 22B formed on the adjacent concrete form 12.

The concrete forming system 10 also includes a turnbuckle brace assembly 40 for helping to support and if necessary align the concrete forms and/or ensure that the panels are not out of plumb. The illustrated turnbuckle brace assembly 40 includes a turnbuckle attachment that is formed as a universal turnbuckle clip 44 according to the teachings of the present invention. The turnbuckle clip 44 is coupled to one end of a coil thread turnbuckle device 46 that allows the overall length of the turnbuckle brace assembly to be adjusted according to known techniques. The other end of the coil thread turnbuckle device 46 is coupled to a bracing arm 48. The bracing arm 48 can be secured to any anchor type of support device as is known in the art.

According to one embodiment, the turnbuckle brace assembly 40 employs a turnbuckle clip 44 according to the teachings of the present invention for supporting one or more concrete form panels. Due to the size, shape, and configuration of the turnbuckle clip 44, the turnbuckle brace assembly 40 is able to be attached to multiple different types and styles of panel bars, thus forming in general a universal turnbuckle clip. Moreover, the turnbuckle clip 44 resists rotation and avoids the tendency of conventional turnbuckle plates to disengage from a shoulder bolt. Still further, damage to reusable form panels is reduced as compared to conventional solutions.

With regard to FIGS. 2-10, and in particular with regard to FIGS. 2-5, the illustrated turnbuckle clip 44 has a main body 52 that has opposed side ends 54, 56 and opposed top and bottom ends 58 and 60, respectively. The side ends 54, 56 are spaced apart a selected distance and preferably are spaced apart by an amount sufficient to allow the turnbuckle clip 44 to fit or be accommodated between adjacent shoulder bolts. Further, the top and bottom ends 58, 60 are spaced apart by an amount greater than the height of the panel bar to allow the turnbuckle clip 44 to be easily mounted thereto. The side end 56 (e.g., left side) of the turnbuckle clip 44 has a groove or channel 62 formed therein. The channel 62 is sized and dimensioned to accommodate the shaft of a shoulder bolt 22 and has a selected length or depth and height. The length of the channel 62 should be sufficient to prevent the clip from disengaging from the shoulder bolt when the turnbuckle clip 44 is installed, but not so deep in length as to impact the structural integrity of the turnbuckle clip. Preferably, the channel 62 should extend about halfway through the main body 52. The opposed side end 54 (e.g., right side) also includes a groove or channel 64 that is larger in height than the channel 62 but is shallower or smaller in depth or length than the channel 62. The channel 64 is sized and dimensioned to accommodate if necessary the head of a shoulder bolt of the panel bar. Further, since the vertical location of the shoulder bolts on the panel bars differ by manufacturers, the channel 64 is oversized so as to be able to accommodate the various locations of the shoulder bolts while concomitantly allowing the latch 28 to swing into mating contact with a shoulder bolt, such as shoulder bolt 22B. Also, the shallow depth of the channel 64 provides sufficient distance between the sides 54 and 56 of the clip so that the side 54 contacts the edge portion of the latch 28 when mounted on the shoulder bolt 22B. In this mounting configuration, the shoulder bolt 22A is also retained within the channel 62 of the clip, thus preventing disengagement between the clip and the shoulder bolt.

The top end 58 of the turnbuckle clip 44 is also bent in a first direction (e.g., inwardly) towards the panel bar so as to form a lip portion 68. The top lip portion 68 is sized and configured to engage or seat on a top portion of the panel bar 20 during use. The bottom end 60 of the turnbuckle clip 44 has a first inwardly extending lip portion 72 and a separate outwardly extending skirt portion 76. The lip portion 72 and the skirt portion hence extend in generally opposite directions with regard to the main body. The skirt portion 76 has an aperture 78 formed therein that is sized and dimensioned to seat or retain one end of the coil thread turnbuckle device 46 of the turnbuckle brace assembly 40.

Figure 6:
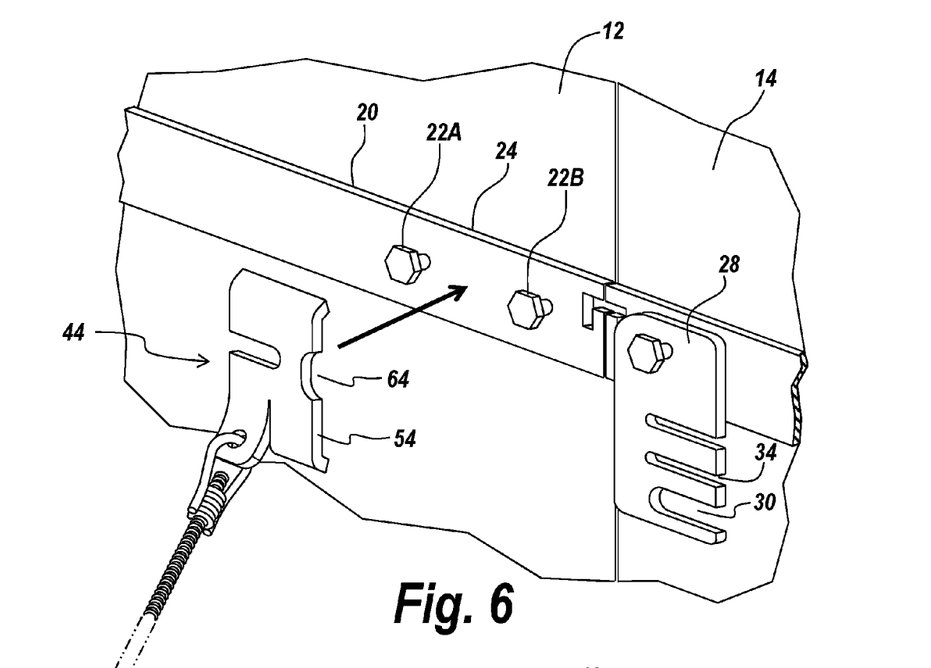
FIGS. 6-10 show an exemplary installation procedure for attaching the turnbuckle clip and turnbuckle clip assembly to a panel bar.
Figure 7:
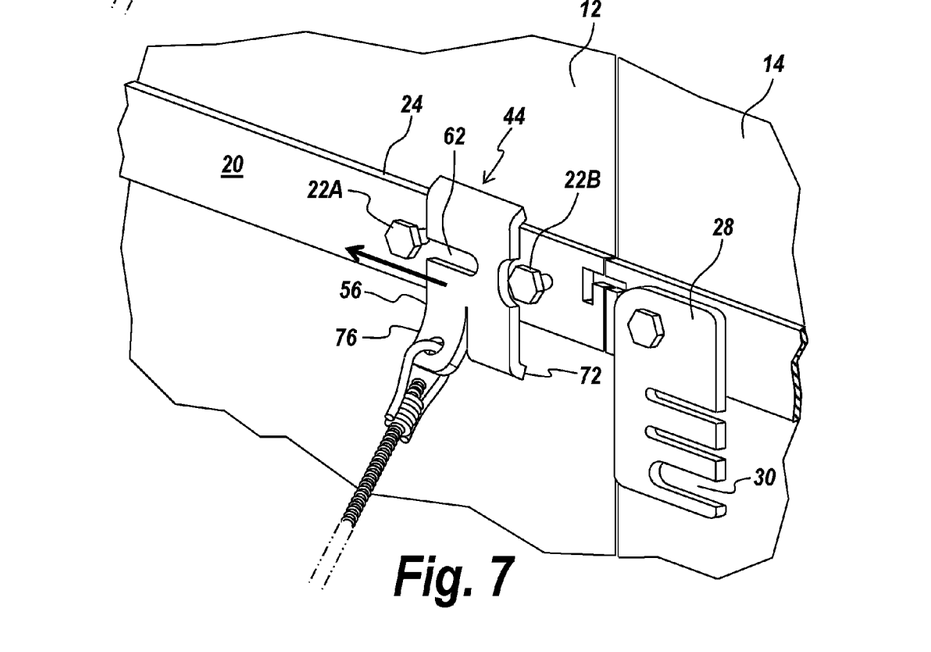

In use, when a concrete wall is being formed by the use of the illustrated concrete forming system 10, the concrete forms and associated panel bars are positioned in place. As shown in FIGS. 6-10, the turnbuckle clip 44 of the present invention when forming part of the turnbuckle brace assembly 40 has a selected width that allows it to be properly positioned between a pair of adjacent shoulder bolts 22A and 22B that are typically located towards an end of the panel bar of the concrete forms 12, 14. The channel 64 is sized so as allow the side end 54 of the clip to be disposed about the shoulder bolt 22B. The turnbuckle clip 44 can thus be easily mounted between the pair of adjacent bolts 22A, 22B without regard to the specific vertical location of the bolts, such as bolt 22B, on the panel bar (FIG. 6). The top lip portion 68 of the turnbuckle clip 44 is adapted to engage a top portion or edge 24 of the panel bar. The channel 62 formed in the side end 56 of the clip is aligned with the shaft of the shoulder bolt 22A and then the clip is moved in the direction shown by the arrow in FIG. 7 so that the bolt shaft seats within the channel, and preferably engages an end portion of the channel.

Figure 8:
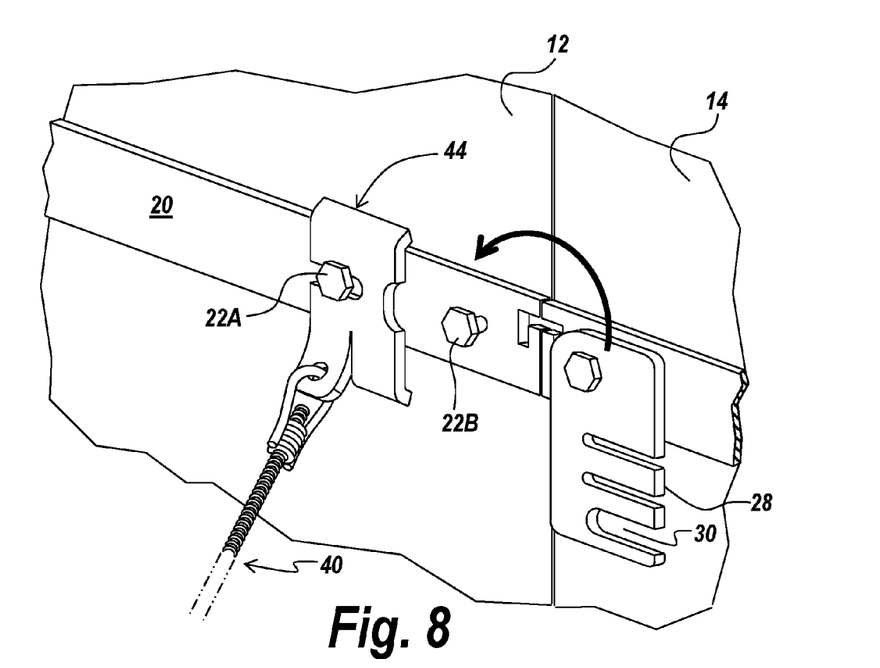
Figure 9:
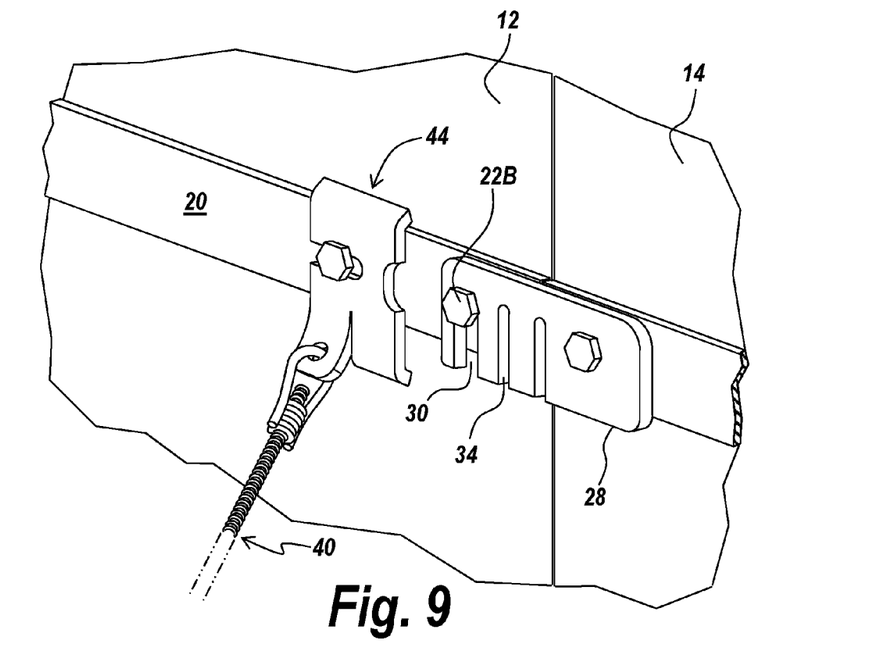
Figure 10:
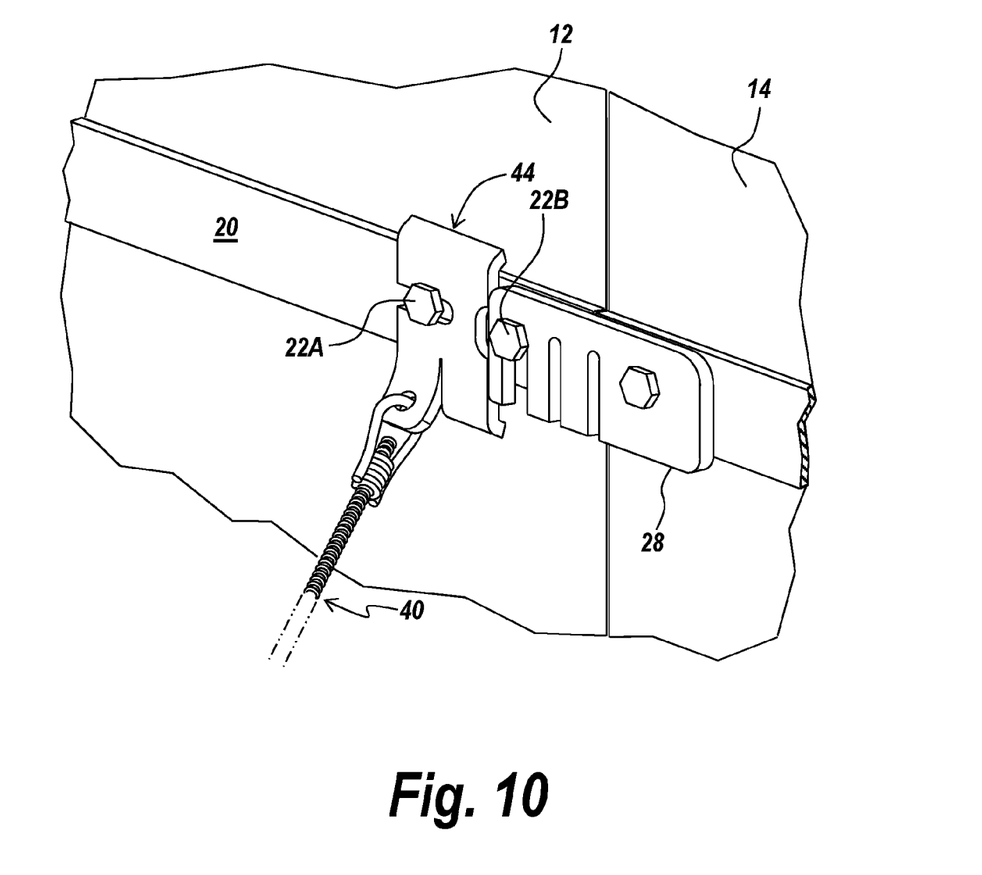

The latch 28 attached to the panel bar and associated shoulder bolt of the adjacent concrete form 12B is swung in the direction shown by the arrow in FIG. 8 so that a channel 30 formed in the latch engages with a selected shoulder bolt, such as for example bolt 22B. The latch serves to secure the adjacent panels 12 and 14 to each other during use. The other channels 34 formed in the latch are adapted to seat an end of one or more tie-rods, as is known in the art. Further, the channel 64 is also sized and dimensioned to provide sufficient clearance to allow the latch 28 to swing into place without interference (FIG. 9). Once secured in place, if desired, the clip can be positioned and secured between the adjacent shoulder bolts 22A and 22B such that an outermost end of the latch adjacent the bolt 22B can contact the linear edge portions of the side end 54 of the clip (FIG. 10), thus preventing the clip from sliding laterally along the panel bar.

The width of the main body 52 of the turnbuckle clip 44 is preferably in the range of between about 2 inches and about 2.5 inches, and preferably is about 2.1875 inches. The width of the turnbuckle clip 44 main body may be selected so that when the channel 62 engages with the shoulder bolt 22A, the latch 28 may still be secured by lowering the latch 28 onto the shoulder bolt 22B (thereby setting a maximum size on the clip width). The clip 44 may be sized smaller than this maximum width in order to provide clearance for the latch, but should not be made so small as to allow the clip to slide away from the second shoulder bolt so far as to allow the second shoulder bolt to fall out of the channel 62 when the clip is installed. The width of the main body 52 of the turnbuckle clip 44 and the depth of the channel 62 may be varied within these parameters.

As set forth above, the turnbuckle brace assembly 40 has a top lip portion 68 and a bottom lip portion 72. The top and bottom lips 68, 70 may be configured to connect and interface with one or more edges of the panel bar 20. The height of the panel bar is larger than the typical height of conventional panel bars to allow the user to allow either the top lip or the bottom lip to engage with the panel bar as a function of the vertical location of the shoulder bolts on the pane bar. For example as shown in the current Figures, the bolts 22A, 22B can be located in a central portion of the panel bar (or below), thus positioning the clip in such a manner that the top lip 68 engages with the top portion or edge 24 of the panel bar. If the bolts were located vertically higher (above center) of the panel bar, then the bottom lip 72 of the turnbuckle clip 44 may engage with a bottom edge of the panel bar. As such, a distance between the top lip 68 and the bottom lip 72 may be selected so as to engage either channel with the shoulder bolts on multiple different commercially available types of panel bars while simultaneously mating a top or bottom lip to the panel bar. Thus, the illustrated clip is essentially a universal clip and can be used with concrete forms of different manufacturers.

According to one exemplary embodiment, the lips 68, 72 may be formed as a bent portion in the relatively flat main body portion of the clip at either end of the face of the clip. According to one practice, a distance between the top and bottom lips (i.e., at the location on the face of the main body where the body begins to bend) may preferably be in the range of about 2.25 inches to about 2.375 inches, and is preferably about 2.3125 inches. Such a range allows for at least one of the lips of the turnbuckle clip 44 to interface securely with at least one edge of the panel bar 20 while maintaining a secure position between the shoulder bolt 22A, 22B and the latch 28, given the most common configurations of panel bars. Preferably, the distance between the lips is not made too small, which would cause the turnbuckle clip not to fit on the panel bar (as either of the lips of the turnbuckle clip may fail to engage with the edge of the panel bar). Moreover, the distance between the top and bottom lips 68, 72 should preferably not be made too large, which would cause the turnbuckle clip to wobble, resulting in a less secure connection (particularly when the bracing arm applies a force to the turnbuckle clip during the alignment operation).

As shown in FIGS. 1 through 10, when deployed the channel 62 of the turnbuckle clip 44 engages with the shoulder bolt 22A of the panel bar 20. The top lip 68 engages with the top edge portion 24 of the panel bar 20 in order to prevent the clip 44 from rotating (alternatively, the bottom lip can engage with the bottom edge of the panel bar). Although some small amount of clearance exists between the clip and the panel's latch (in order to facilitate installation), the side end 54 of the turnbuckle clip 44 engages with the latch 28 when positioned to the right in the Figures. This provides additional security in keeping the turnbuckle clip 44 from rotating off, or sliding off, of the panel bar 20. Specifically, the shoulder bolt 22A is retained within the channel 62, thus preventing the clip from disengaging from the bolt when the latch is in place.

The same turnbuckle clip 44 can be employed with a different type of panel bar having a different configuration of shoulder bolts (e.g., shoulder bolts provided higher or lower on the panel bar) by affixing the bottom lip to the bottom of the panel bar while the channel 62 engages the shoulder bolt 22A. Due to the shape, size, and configuration of the clip 44, depending on the bolt location along the height of the panel bar, either the top lip or the bottom lip of the turnbuckle clip 44 engages with an edge of the panel bar (top or bottom, respectively). Thus, the clip is suitable for use with multiple different configurations of panel bars and hence functions as a universal clip.

As shown in FIG. 1, the concrete forming system 10 can also employ a turnbuckle brace assembly 40 that may include an integral or detachable bracing arm 48. The bracing arm 48 may be sized so as to reach from the turnbuckle clip 44 to the ground when the turnbuckle clip is deployed on a panel bar 20 of the concrete forms 12, 14 and may be sized and configured to support the concrete forms and move the forms inwardly or outwardly in order to properly align the form panels.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A clip for use with a turnbuckle assembly, comprising a main body having opposed first and second side ends separated by and which define an axial width of the clip, wherein the first side end has a first channel formed therein and the second side end has a second channel formed therein, wherein the length of the first channel is greater than the length of the second channel and the height of the second channel is greater than the height of the first channel, wherein the first and second channels are axially aligned relative to each other along the axial width and the length of the first channel is generally about half of the axial width of the clip, wherein the main body also includes opposed top and bottom sides, wherein the top side has a first lip portion formed thereon and the bottom side has a second lip portion formed thereon, wherein the first and second lips extend generally outwardly in the same direction relative to a face of the main body, and wherein the bottom side also includes a skirt portion that is separate and distinct from the lip portion and the skirt portion extends in a direction generally opposite to the direction of the second lip, and wherein the skirt portion and the lip portion are formed between the first and second side ends having the first and second channels, respectively, and define the axial width of the clip.

2. The clip of claim 1, wherein the skirt portion includes an aperture formed therein.

3. The clip of claim 1, wherein the main body has a width in the range of between about 2 inches and about 2.5 inches.

4. The clip of claim 3, wherein the main body has a width of about 2.1875 inches.

5. The clip of claim 1, wherein a distance between the first and second lips is between about 2.25 inches and about 2.375 inches.

6. The clip of claim 5, wherein the distance is about 2.3125 inches.

* * * * *